Figure 1:
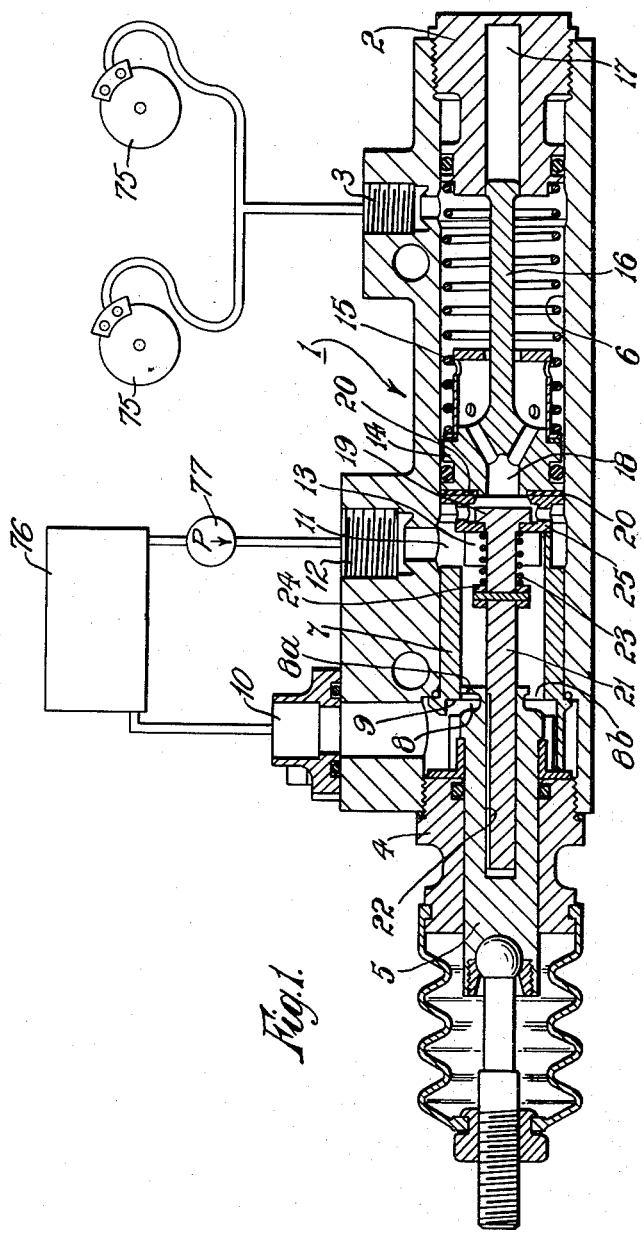

July 18, 1961  H. HODKINSON  2,992,533
FLUID PRESSURE CONTROL MECHANISM
Filed June 6, 1956  2 Sheets-Sheet 1

INVENTOR
Harold Hodkinson
by Benj. T. Pauber
his attorney

July 18, 1961    H. HODKINSON    2,992,533
FLUID PRESSURE CONTROL MECHANISM
Filed June 6, 1956    2 Sheets-Sheet 2

INVENTOR
Harold Hodkinson
by Benj. T. Clauber
his attorney united States Patent Office 2,992,533
Patented July 18, 1961

2,992,533
FLUID PRESSURE CONTROL MECHANISM
Harold Hodkinson, Coventry, England, assignor to Dunlop Rubber Company Limited, London County, England, a British company
Filed June 6, 1956, Ser. No. 589,814
11 Claims. (Cl. 60—52)

This invention relates to fluid-pressure control mechanisms, particularly to master cylinders for vehicle braking systems.

Many motor vehicles, particularly of the larger and faster type, are provided with braking systems wherein hydraulic pressure is generated by a pump actuated, e.g., by a drive from the transmission or engine and this circulates liquid from a tank, through a master-cylinder and thence back to the tank. To apply the brakes the driver depresses a foot pedal which in effect closes a valve in the master-cylinder to prevent or restrict the flow of liquid back to the reservoir and to permit the flow of liquid under pressure to the brakes. Means are also provided to pressurise the brakes when the pump is not operating, e.g. when the engine is not running.

My invention provides an improved fluid-pressure control mechanism for braking and like hydraulic systems.

According to my invention a master-cylinder to provide alternative means of operating a hydraulic device comprises a housing adapted to be connected to a pump or like pressure source, to a reservoir, and to said hydraulic device, a plunger or like member movable in the housing and normally permitting free flow of liquid from the pump to the reservoir, a first means associated with said member and actuated by movement thereof to cut off the flow of liquid to the reservoir, thereby to build up operating pressure in said device, and an alternative means associated with said first means and operative when said pump is inoperative to cut off fluid communication between the pump and the device and to apply direct mechanical pressure to the liquid in the master-cylinder, and a foot-pedal or the like to actuate said first means and, if said pump or like pressure source is inoperative automatically to actuate said alternative means.

According also to the present invention a master-cylinder to provide alternative means of operating vehicle brakes comprises a housing having liquid communication with said brakes, an exhaust connection in liquid communication with a liquid reservoir, and an inlet connection in liquid communication with a pump or like pressure source, a piston slidable in the housing and having a liquid passage therethrough, a normally-open valve to close said passage, a manual or foot-operated plunger movable in the housing for a predetermined distance to restrict or prevent the flow of liquid from said pump or like pressure source to the reservoir whereby to increase the pressure in the housing to operate said brakes from said pump or like pressure source, and alternative means for operating said brakes if said pump or like pressure source is not operative, comprising means associated with said valve and with said plunger whereby, on moving the plunger beyond said predetermined distance the valve is closed and the piston is moved to pressurize the liquid between the piston and the brakes.

Figure 2:
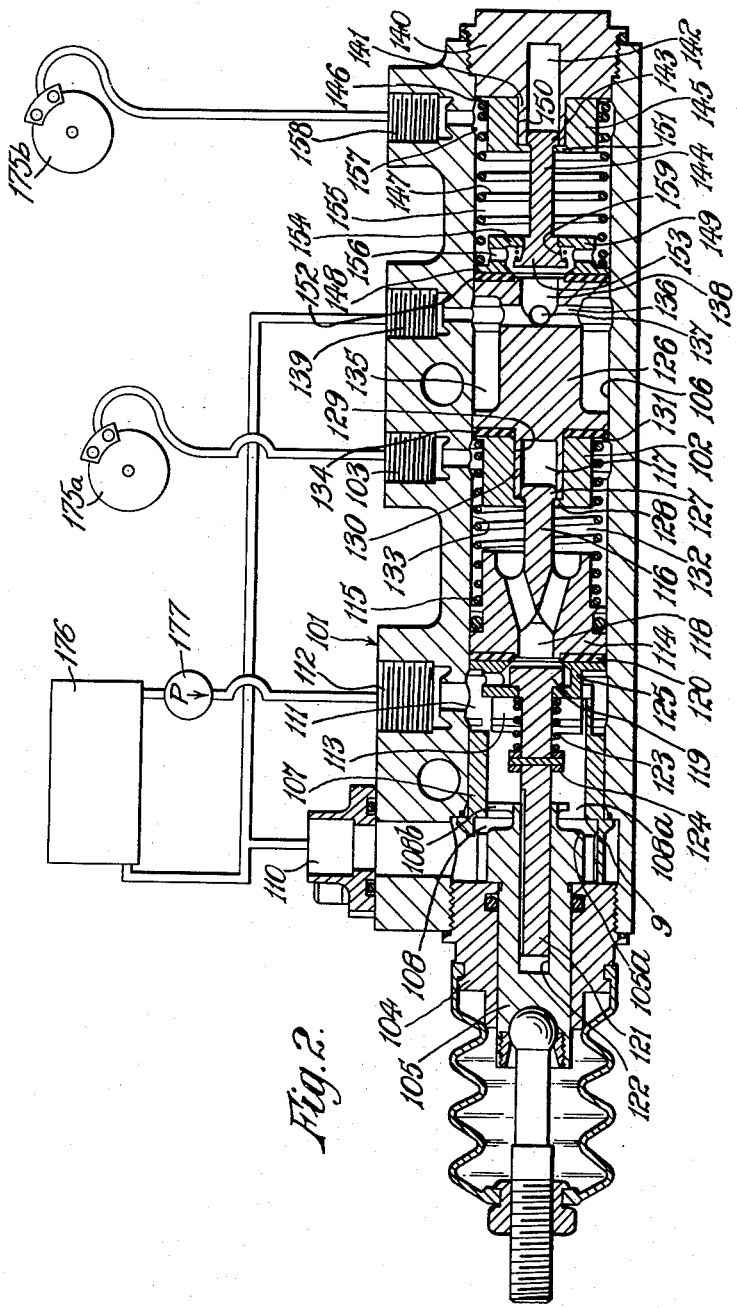

The invention will now be described with reference to the accompanying drawings, of which:

FIGURE 1 is a longitudinal cross-section through one embodiment of a master-cylinder according to the invention, and FIGURE 2 is a similar cross-section of a further embodiment of a master-cylinder, also according to the invention.

In the embodiment of the present invention illustrated in FIGURE 1 a master-cylinder for a vehicle four-weel braking system comprises a hollow cylindrical housing 1 having a closure-member 2 fluid-tightly sealing one end thereof. The housing is provided, adjacent said end, with an outlet connection 3 adapted to communicate with the braking mechanism 75 of the front and rear wheel brakes. An annular bush 4 is fluid-tightly secured to the other end of the housing and a plunger 5 is fluid-tightly slidable therein, said plunger being actuated by a foot pedal in a conventional manner.

The bore 6 of the housing, at the end adjacent the plunger 5, is sleeved as at 7 to a smaller diameter and the end of the plunger is adapted to enter the adjacent end of the sleeve, said end being provided with an annular groove 8, and a fluted flange 8a having apertures 8b formed therein, which forms a guide to locate the plunger co-axially in the sleeve 7 when in its fully withdrawn position. The periphery of the plunger adjacent the grove 8 is slightly tapered for a purpose later to become apparent. The housing 1 is provided, between the annular bush 4 and the adjacent end of the sleeve 7, with an annular groove 9 which is adapted to communicate, through an exhaust connection 10, with a liquid reservoir 76. The other end of the sleeve 7 is provided with an annular recess 11 which is adapted to communicate, through an inlet connection 12, with the output side of a pump which is driven off the transmission. The base of the annular recess 11 is slotted as at 13 to enable liquid under pressure to flow into the interior of the sleeve 7 and thence, when the end of the plunger 5 is spaced away from its associated end of the sleeve, back to the liquid reservoir 76, through the annular groove 9 and the exhaust connection 10.

A piston 14 is fluid-tightly slidable in the bore of the housing 1 and a helically wound spring 15 in compression is fitted between the closure member 2 and the piston 14 normally to force said piston into contact with the adjacent end of the sleeve 7, which acts as a stop for the piston. The piston 14 is provided integrally with a guide 16 which slides in a passage 17 in the closure member 2 to maintain the piston in alignment, and this guide 16 and passage 17 together form a dash-pot.

The piston 14 is provided centrally with a conduit 18 to enable liquid to pass from one side thereof to the other, and the conduit 18 is shaped to be closed by a valve 19 which is adapted to seat on the inner periphery of a flat, annular sealing washer 20 associated with the piston, the outer periphery of the washer forming a seal to prevent leakage past the outer periphery of the piston.

The valve 19 is provided with a stem 21 which extends axially away from the piston 14 and is loosely slidable in a passage 22 in the plunger 5. The valve 19 is normally maintained open by a helical spring 23 in compression between an abutment 24 on the valve stem and an annular flange 25 extending inwardly from the end of the sleeve 7 adjacent the valve 19, said flange 25 also serving to prevent excessive movement of the valve 19 in an opening direction. The end of the valve stem 21 is spaced a short distance from the end of the passage 22 in the plunger 5, and said distance is greater than the distance between the restricted end of the plunger 5 and the associated end of the sleeve 7 which it is adapted to enter but from which it is normally spaced.

With the engine running to drive the pump 77 liquid is forced into the housing 1 through the connection 12 where it passes through the sleeve 7 and thence back through the connection 10 to the reservoir 76 which is at atmospheric pressure. It also passes through the open valve 19 in the piston 14 and thence to the wheel brakes 75 but since the housing is connected to atmosphere the pressure is too low to operate the brakes.

When it is required to brake the vehicle, the plunger 5 is moved by the foot pedal until the tapered end thereof just enters the sleeve 7 of the housing. This stops or restricts the flow of liquid under pressure back to the reservoir 76 and immediately builds up the pressure in the housing 1 and in the wheel brakes 75 to a value determined by the driver, who has his foot on the foot pedal which actuates the plunger 5. The pressure in the housing 1 can be "felt" by the driver and thus the actual braking pressure can be controlled within fine limits. The actual stroke of the plunger 5 is substantially uniform for each brake application, regardless of wear of the brakes, the difference in plunger movement between light braking and hard braking being extremely small. The valve 19 in the piston 14 is open during this operation and this allows automatic recuperation of the system due to liquid loss or to an increased volume, e.g. to contraction of the seals, wear or expansion of the brake drums and the like. It also allows the full volume of the pump 77 to be supplied to the brakes 75.

If it is required to brake the vehicle when the engine is not running to drive the pump 77, or if the pump has broken down, then the foot pedal is further depressed to force the plunger 5 further down the sleeve 7. There is no liquid under pressure in the housing to resist this movement. As the plunger enters the sleeve the valve stem 21 bottoms in the passage 22 in the plunger, and continued movement of the plunger in this direction first seats the valve 19 against its spring 23 to close the conduit 18 through the piston 14 and then moves the piston against the piston return spring 15 to compress the liquid in the bore of the housing and thus apply all four wheel brakes 75 in the normal manner. Owing to the differential in areas between the plunger 5 and piston 14 a greater effort is required to apply the brakes than when the pump 77 is operating.

On removal of the braking force from the foot-pedal the piston return spring 15 moves the piston 14 back to its inoperative position to relieve the braking pressure and the valve 19 opens under the action of its own spring 23 to allow liquid from the reservoir 76 to flow through the sleeve 7 and into the bore of the housing to replenish liquid losses.

In a further embodiment of the invention as illustrated in FIGURE 2, the construction of the left-hand portion of the master cylinder is substantially identical with that shown in FIGURE 1 of the drawings, and the reference numerals of FIGURE 1 have been given the prefix of 100 in FIGURE 2 merely to avoid confusion in the description of the manner of operation of the master cylinder illustrated in the latter figure.

The connection 103, in this embodiment of the invention, leads only to the rear brakes 175a of the vehicle, the front brakes 175b being in communication with another connection as is later to be described.

The guide 116 of the piston 114 is received in a recess 117 in a second piston 126 which is axially aligned with the piston 114 and normally held spaced apart therefrom by the compression spring 115, the extent of this axial separation being limited by the engagement of the enlarged head 127 of the guide 116 with the inturned flange 128 on an annular member 102 formed with a co-axial central passage 129 which engages over an annular boss 130, integral with the piston 126, and in which is formed the recess 117. The spring 115 engages an out-turned annular flange 131 on the member 102 and its reaction urges the member 102 away from the piston 114 until the enlarged head 127 of the guide 116 engages behind the flange 128. An annular fluid chamber 132 is thus provided betwen the piston 114 and the member 102, and this chamber is in fluid communication with the connection 103 to the rear brakes through the annular recess 133 in which is located the spring 115.

The spring 115 presses the member 102 firmly against the adjacent end of the piston 126, a fluid sealing washer 134 being interposed therebetween. The piston 126 is slidable in the bore 106 of the cylinder 101 and is formed midway of its length with an annular recess 135 which extends through substantially the major axial length of the piston. At the end of the recess 135 remote from the member 102 the piston 126 is provided with passages 136, 137 drilled diametrically across the piston at right angles to one another and providing fluid communication between the recess 135 and a passage 138 formed coaxially in the end of the piston 126 remote from the member 102. A fluid connection 139 leads from the cylinder 135, to the reserve tank 176 for brake fluid.

The adjacent end of the cylinder 101 is closed by a closure member 140 fluid-tightly sealing the bore 106, and extending axially inwardly from this closure member and integral therewith is an annular co-axial boss 141. The recess 142 in this boss is extended into the closure member 140 for some distance and receives the enlarged head 143 of a plunger 144 which is associated with the piston 126 as described hereunder. A member 145 having an out-turned annular flange 146 is held in abutment against the closure member 140 by a compression spring 147 which engages the flange 146 at one of its ends and an out-turned flange 148 of a cage member 149 associated with the piston 126 at its other end. The member 145 is formed with a recess 150 which slides axially over the boss 141, and the inner periphery of an annular in-turned flange 151 on the member 145 extends partly over the recess 142 and prevents the spring 147 from withdrawing the head 143 of the plunger 144 from the recess 142.

The cage member 149 is pressed against the adjacent end of the piston 126 by the spring 147, and interposed between the cage and the piston is an annular resilient valve seat 152 which is engageable by a valve head 153 which is normally held away from its seat by the action of the spring 147, an inturned annular flange 154 on the cage member 149 limiting the axial withdrawal of the valve and, accordingly, the axial separation of the piston 126 and the closure member 140. This axial separation of the piston and the closure member provides an annular fluid chamber 155 therebetween, this chamber being normally in fluid communication with the reserve fluid tank 176 through the connection 139, annular recess 135, passages 136, 137, the normally-open valve 152, 153 and passage 156 in the cage member 149. The chamber 155 is also in fluid communication with the front brakes 175b of a vehicle through an annular recess 157 defined by the member 145 and the flange 146, and a fluid connection 158 in the wall of the cylinder 101.

A compression spring 159 is located between the valve head 153 and the flange of the cage member 149 in such a manner that the valve head 153 is positively urged on the resilient seat 152 to close this fluid passage immediately upon compression of the spring 147 by axial movement of the piston 126 towards the closure member 140 as will be described.

From the foregoing description it will be seen that the rear brakes 175a of the vehicle are normally in fluid communication with the fluid pump 177 through the connection 112, the passages 111, 113, 118 and 133 and the connection 103, the pressure of the pump 177 being by-passed through the passages 108 and 103b to the connection 110 and the fluid reserve tank 176. Thus whilst pressure fluid is constantly flowing into this space from the pump whenever the pump 177 is in operation, no braking pressure is built up; the flow merely serving to keep the rear brake fluid lines and this portion of the master cylinder filled with fluid to the exclusion of air.

The front brakes 175b of the vehicle are in communication with the reserve fluid tank 176 through the connection 139, chamber 135, passages 136, 137, 138, 156, chamber 155, passage 157 and connection 158. The front brakes are not in communication with the fluid pump 177, and the reserve tank 176 is located in such a position in relation to the master cylinder that a static head of fluid is available to keep this portion of the fluid system continually full of fluid to the exclusion of air.

Normal operation of this master cylinder is as follows:

Upon actuation of the brake pedal or the like to apply the brakes the plunger 105 is moved until the tapered end 105a thereof just enters the sleeve 107 of the cylinder housing 101. This closes or partly closes the fluid passage 108 to the connection 110 to the reserve fluid tank 176; the extent of this closure depending upon the depth to which the tapered end 105a of the plunger 105 is entered into the sleeve 107. Pressure from the pump 177 thus increases in the chambers 111 and 113, passage 118 chamber 132, passage 133 and connection 103 to the rear brakes 175a, which are accordingly applied to an extent governed by the depth of penetration of the tapered portion 105a in the sleeve 107 as previously referred to.

The pressure within the chambers 113 and 132 reacts, respectively, upon the adjacent faces of the cage 125 and piston 114, and upon the member 102, and these two pistons 114 and 126 are moved to the right (as shown in the drawings). This movement of the piston 114 draws with it the valve 119 and its stem 121, so that the valve remains open.

Movement of the piston 126 under the influence of the fluid pressure in the chamber 132 relieves the compression on the spring 159 which restrains the plunger 144 from axial movement until the valve head 153 has engaged the resilient valve seat 152 to close the fluid passages 136, 137, 138 and the fluid line from the connection 139 to the reserve tank 176. With the closure of this valve, further axial movement of the pistons 114 and 126 pressurises the fluid in the chamber 155, passage 157 and the fluid line from the connection 158 to the front brakes 175b, and causes these brakes to be applied to an extent proportionate to the fluid pressure in the chamber 132 and in the rear brakes 175a.

In the event of failure of the pump 177 by which the braking pressure is normally supplied to the rear brakes 175a, or should it be desired to apply the brakes when the pump is not in operation, the plunger 105 is pressed further than is normally necessary. This causes the end of the valve stem 121 to bottom in the recess 122. Further axial movement of the plunger 105 moves the valve 119 onto its resilient seat 120 to entrap the fluid in the chamber 132, and then moves the piston 114 to pressurise the fluid in chamber 132 to apply the rear brakes 175a. The pressure in the chamber 132, assisted by the compression spring 115 also moves the piston 126 to the right, as shown in the drawings, firstly to close the valve 152, 153, as previously described, and then to pressurise the fluid in the chamber 155 to apply the front brakes.

Upon release of the braking pressure, the springs 115 and 147 operate to return the pistons and valves to their inoperative positions.

It should be appreciated that in the first embodiment of the invention herein described, there is no axial movement of the piston 14 when the brakes are being applied under the influence of the pump-supplied fluid pressure. In the second embodiment described, axial movement of the piston 114 takes place whether or not the pump is in operation.

The advantage of a master-cylinder constructed in accordance with the present invention is that it is operable to actuate all four wheel brakes irrespective of whether the pump is working or not. In addition, when the pump is working, and a pressurized system is employed, the stroke of the plunger is substantially constant at all times and the driver can "feel" the operating pressure at the brakes.

Having now described my invention—what I claim is:

1. A master cylinder for power driven brakes which comprises a housing having a bore and having a return outlet adjacent one end of said bore, at least one delivery outlet from said bore at a distance from said end and an inlet to said bore between said delivery outlet and said return outlet; a plunger slidable through a limited range longitudinally in said bore to cover and close said return outlet progressively and movable beyond said limited distance past said return outlet; a piston slidable in said bore between the inlet and the delivery outlet and having a liquid passage therethrough normally open to deliver liquid to said delivery outlet; and a valve having an operating rod between said plunger and said piston and positioned to be contacted and moved by said plunger to close said valve and to move said piston toward said delivery outlet when said plunger moves beyond said limited range thereby to displace liquid confined between said piston and said delivery outlet through said delivery outlet under pressure.

2. The master cylinder of claim 1 comprising spring means disposed between said piston and a fixed portion of said housing, said fixed portion comprising a closure member secured in the adjacent end of said bore and said spring means being adapted to restrain said piston against axial movement in said bore during movement of said plunger through said limited distance and to permit axial movement of said piston upon movement of said plunger in excess of said limited distance.

3. A master cylinder for power driven brakes which comprises a housing having a bore and having a first return outlet adjacent one end of said bore, a second delivery outlet from said bore at a distance from said first return outlet, a second return outlet between said second delivery outlet and said first return outlet, a first delivery outlet between said second return outlet and said first return outlet and an inlet between said first delivery outlet and said first return outlet; a plunger slidable through a limited distance longitudinally in said bore to cover and close said first return outlet progressively and movable beyond said limited distance; a first piston slidable in said bore between said inlet and said first delivery outlet and having a liquid passage therethrough normally open to deliver liquid to said first delivery outlet, a valve between said plunger and said piston to close the passage through said piston and a spring to hold said valve from closed position, an operating rod between said plunger and said piston and positioned to be contacted and moved by said plunger to close said valve and to move said piston toward said delivery outlet when said plunger moves beyond said limited distance thereby to displace liquid confined between said piston and said first delivery outlet, a second piston slidable fluid-tightly in said bore between said delivery outlets and overlying said second return outlet and having a valve passage communicating between said second return outlet and the second delivery outlet and a valve positioned and spring pressed to close said valve passage and normally held in open position by engagement with an element of said housing and released to close upon movement of said piston toward said second delivery outlet.

4. The master cylinder of claim 3 in which the valve of said second piston has a stem extending axially of said bore and enlarged at its free end and the adjacent end of the bore has a recess to receive said enlarged free end and narrowed at its open end to engage and hold said end of said stem from withdrawal from said recess and to permit it to move longitudinally in said recess as said piston and valve move toward the adjacent end of the bore.

5. A master cylinder to provide alternative means of operating a hydraulic device comprising a housing having an axial bore therethrough, axially spaced conduits connecting said bore with a liquid reservoir, a liquid pump, a portion of said hydraulic device, said liquid reservoir, and a further portion of said hydraulic device, respectively, a plunger, an intermediate piston and a second piston slidable in said bore in axially spaced relationship and normally adapted to provide a free flow of liquid between said liquid pump and said reservoir through a chamber in said bore defined by adjacent ends of said plunger and said intermediate piston, a liquid passage formed through the head of said intermediate piston, a first pressure chamber in said bore defined by the head of said intermediate piston and the base of said second piston, said first pressure chamber being in liquid communication with the conduit to the first named portion of said hydraulic device, spring means in said first pressure chamber adapted to urge said pistons axially apart and telescopic limiting means connecting said pistons and adapted to limit the amount of said axial separation, an annular peripheral recess on said second piston adapted to straddle a passage from said bore to the second-named conduit to said liquid reservoir, a liquid passage formed in said second piston between said annular recess and the radial face thereof remote from said intermediate piston, a closure member in the adjacent end of said bore, the adjacent ends of said closure member and said second piston between them defining a second pressure chamber in liquid communication with said further portion of said hydraulic device, spring means in said second pressure chamber normally urging said second piston away from said closure member, a valve member telescopically associated with said closure member and with the liquid passage through said second piston and normally operable to limit the axial separation between said second piston and said closure member, said valve member having a headed portion adapted to close said liquid passage through said second piston upon initial movement of said second piston towards said closure member, restrictor means on the inner end of said plunger, a second valve member between said intermediate piston and said plunger and having a lost-motion associated therewith, and actuating means operable to slide said plunger within said bore, operation of said actuating means to slide said plunger for a distance equal to the amount of said lost motion being adapted progressively to obstruct the free flow of liquid to said reservoir from said pump and to divert said flow through said intermediate piston into said first pressure chamber and to said first portion of said hydraulic device, and the liquid pressure in said first pressure chamber being adapted to move said second piston axially in said bore first to cause said valve member to close the liquid passage therethrough and subsequently to pressurize the liquid in said second pressure chamber and said other portion of said hydraulic device, and operation of said actuating means in excess of the amount of said lost-motion, when said pump is inoperative, being adapted first to cause said further valve member to close the liquid passage through said intermediate piston and subsequently to move said intermediate piston axially in said bore to pressurize the liquid in said first pressure chamber and the said first-named portion of said hydraulic device, the pressure in said first pressure chamber being adapted to pressurize the liquid in said second pressure chamber as hereinbefore defined.

6. A master cylinder to provide alternative means for operating a hydraulic brake applying system upon failure of fluid pressure which comprises a housing having a bore closed at one end and having at least one delivery outlet from the part of said bore near said closed end, a return outlet spaced longitudinally of said bore from said delivery outlet and an inlet entering said bore between said return outlet and said delivery outlet; a piston slidable fluid tightly in said bore between said inlet and said delivery outlet, said piston having a passage therethrough to provide communication from said inlet to said delivery outlet; a valve at the inlet end of said passage spring pressed to open position; a plunger extending through the end of said housing adjacent said return outlet and slidable through an initial distance to close progressively the return outlet and through a further distance successively to contact and close the valve to said passage through said piston and to push said piston toward said closed end of said bore to expel fluid between said piston and said delivery outlet through said delivery outlet.

7. The master cylinder of claim 6 in which said plunger has a stem extending to contact said valve and having a sliding engagement with the plunger to permit said initial movement of said plunger and then to be engaged and moved by said plunger to close said valve and move said piston.

8. A master cylinder for power driven brakes which comprises a housing having a bore closed at one end and open at the opposite end, and having a return outlet near said open end, at least one delivery outlet between said return outlet and said closed end and an inlet between said return outlet and said delivery outlet, said bore being reduced in diameter from said inlet to said return outlet; a piston in said bore slidable between said reduced portion of said bore and said delivery outlet and having a passage for fluid between said inlet and said delivery outlet; a spring pressing said piston toward said reduced diameter portion of said bore; a valve spring pressed away from the inlet end of said passage of said piston and having a stem extending toward the open end of said bore; and a plunger extending through and closing the open end of said bore and slidable to said reduced diameter end of said bore to progressively close the bore from said return outlet and upon further movement to enter said reduced diameter portion of the bore to engage said valve stem and move it to close said passage in said piston and to move said piston toward the closed end of said bore.

9. The master cylinder of claim 8 having a flange spanning the reduced portion of said bore to limit the open position of said valve and in which said bore has passages from said inlet on opposite sides of said flange.

10. The master cylinder of claim 1 in which said plunger is tapered at the end adjacent said return outlet.

11. A master cylinder for power driven brakes which comprises a housing having a bore closed at one end and open at the opposite end and having a return outlet near said open end, at least one delivery outlet between said return outlet and said closed end and an inlet between said return outlet and said delivery outlet, said bore being reduced in diameter from said inlet to said return outlet; a piston in said bore slidable between said reduced portion of said bore and said delivery outlet and having a passage for fluid between said inlet and said delivery outlet; a spring pressing said piston toward said reduced diameter portion of said bore; a valve spring pressed away from the inlet end of said passage of said piston and having a stem extending toward the open end of said bore; and a plunger extending through and closing the open end of said bore and slidable to said reduced diameter of said bore to progressively close the bore from said return outlet and upon further movement to enter said reduced diameter portion of said bore to engage said valve stem and move it to close said passage in said piston and to move said piston toward the closed end of said bore said cylinder having a second piston between the first mentioned pistoned and the closed end of the bore, said second piston being positioned to be engaged by said first mentioned piston and moved toward the closed end of the bore and having a recess in its peripheral surface and a passage from said recess through the end of the piston facing the closed end of the bore; a second valve means for yieldably holding said second valve spaced from said end of the second piston and from said end of the bore to be engaged by said piston to close said passage and to be moved toward the closed end of the bore, said bore having a return outlet from said recess and a delivery outlet from the space between the second piston and the closed end of the bore.

References Cited in the file of this patent

UNITED STATES PATENTS

| | | |
|---|---|---|
| 1,921,590 | Staude | Aug. 8, 1933 |
| 2,004,078 | McDougall | June 4, 1935 |
| 2,136,318 | Rossmann | Nov. 8, 1938 |
| 2,318,756 | Chouings | May 11, 1943 |
| 2,343,698 | Parnell | Mar. 7, 1944 |
| 2,544,042 | Pontius | Mar. 6, 1951 |
| 2,661,597 | Edge | Dec. 8, 1953 |
| 2,676,465 | Gladden | Apr. 27, 1954 |